(12) United States Patent
Park (10) Patent No.: US 7,202,458 B2
(45) Date of Patent: Apr. 10, 2007

(54) DISPLAY AND CONTROL METHOD THEREOF

(75) Inventor: Kil-soo Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/959,260

(22) Filed: Oct. 7, 2004

(65) Prior Publication Data

US 2005/0087671 A1  Apr. 28, 2005

(30) Foreign Application Priority Data

Oct. 28, 2003  (KR) ................... 10-2003-0075461

(51) Int. Cl.
*G01J 1/32* (2006.01)
*G09G 3/36* (2006.01)

(52) U.S. Cl. .............. 250/205; 250/214 AL; 250/214 C; 345/102

(58) Field of Classification Search .......... 250/205, 250/201.1, 214 AL, 214 C; 349/61, 65; 345/87, 102; 315/276, 307
See application file for complete search history.

(56) References Cited

U.S. PATENT DOCUMENTS

| | | | |
|---|---|---|---|
| 5,717,422 A | 2/1998 | Fergason | |
| 5,786,801 A | 7/1998 | Ichise | |
| 5,818,553 A | 10/1998 | Koenck et al. | |
| 6,075,325 A * | 6/2000 | Kouno et al. | 315/307 |
| 6,144,359 A | 11/2000 | Grave | |
| 6,556,258 B1 * | 4/2003 | Yoshida et al. | 349/61 |
| 6,816,141 B1 | 11/2004 | Fergason | |
| 6,888,528 B2 * | 5/2005 | Rai et al. | 345/102 |
| 2002/0070914 A1 * | 6/2002 | Bruning et al. | 345/102 |
| 2002/0153472 A1 * | 10/2002 | Yano | 250/208.1 |
| 2003/0001810 A1 | 1/2003 | Yamaguchi et al. | |
| 2003/0001815 A1 * | 1/2003 | Cui | 345/102 |
| 2003/0210221 A1 * | 11/2003 | Aleksic | 345/102 |

(Continued)

FOREIGN PATENT DOCUMENTS

JP  10-20277  1/1998

(Continued)

OTHER PUBLICATIONS

Patent Cooperation Treaty (PCT) International Search Report, 3 pages, issued by the ISA/KR on Oct. 22, 2004.

*Primary Examiner*—Stephone B. Allen
*Assistant Examiner*—Suezu Ellis
(74) *Attorney, Agent, or Firm*—Staas & Halsey LLP (57) ABSTRACT

A display includes a liquid crystal display panel, a back light, an inverter that supplies electric power to the back light and adjust an intensity of illumination of the back light, a selector that selects a function to adjusts the intensity of illumination of the back light, a brightness distribution data detector that detects the brightness distribution data of the inputted video signal, a sensor that senses the environmental intensity of illumination, and a controller that determines the lightness of an image based on at least one of the environmental intensity of illumination sensed by the sensor for an environmental intensity of illumination and the brightness distribution data detected by the brightness distribution data detector according to the selector, and that controls the inverter to adjust the intensity of illumination of the back light according to the determined lightness.

41 Claims, 5 Drawing Sheets

U.S. PATENT DOCUMENTS

2005/0057484 A1* 3/2005 Diefenbaugh et al. ...... 345/102

FOREIGN PATENT DOCUMENTS

| JP | 2001-134235 A | 5/2001 |
| JP | 2002-108305 A | 4/2002 |
| JP | 2003-15612 A | 1/2003 |
| JP | 2003-122330 A | 4/2003 |
| KR | 10-256190 | 2/2000 |
| KR | 2001-48195 | 6/2001 |
| KR | 2003-38897 | 5/2003 |
| WO | WO 93/23842 | 11/1993 |
| WO | WO 02/42837 A1 | 3/2002 |

* cited by examiner

DISPLAY AND CONTROL METHOD THEREOF

CROSS-REFERENCE TO RELATED APPLICATIONS

This application claims the benefit of Korean Patent Application No. 2003-075461, filed on Oct. 28, 2003, in the Korean Intellectual Property Office, the disclosure of which is incorporated herein by reference.

BACKGROUND OF THE INVENTION

1. Field of the Invention

The present invention relates to a display in which an intensity of illumination of a back light is automatically adjusted according to a brightness of at least one of an intensity of illumination of environment and brightness distribution data of an inputted video signal as a selection of a user to provide the most suitable image and control method thereof.

2. Description of the Related Art

Generally, a display is used to display a video signal inputted from a video card and the like. The display is classified into a light emitting type and a light receiving type.

A cathode ray tube (CRT), a plasma display panel (PDP), and the like, are the light emitting type, so that images are displayed by emitting light.

In contrast, a liquid crystal display (LCD) utilizes two facing substrates with a liquid crystal material between them that is in a state that is sort of like a liquid and sort of like a solid. The LCD displays an image using an electro-optic property of the liquid crystal whose molecular arrangement is varied according to an electric field. Here, the LCD is a passive display that does not emit its own light, such that the LCD requires an external light source to emit light by itself. A back light is generally used as a surface light source for the LCD to uniformly maintain brightness through the screen of the LCD.

Conventionally, the LCD has a button for a user to adjust the lightness of a displayed image and the lightness of the back light, as desired.

However, in the conventional LCD, characteristics of an image (for example, contrast of light and darkness) vary according to an intensity of the environment or the brightness of a inputted video signal. Thus, the user should adjust the lightness of the back light to compensate, which may limit image quality.

SUMMARY OF THE INVENTION

An aspect of the present invention to provide a display in which an intensity of illumination of a back light is automatically adjusted according to a brightness of at least one of an intensity of illumination of environment and brightness distribution data of an inputted video signal as a selection of a user to provide the most suitable image and control method thereof.

Additional aspects and/or advantages of the invention will be set forth in part in the description which follows and, in part, will be obvious from the description, or may be learned by practice of the invention.

The foregoing and/or other aspects of the present invention are achieved by providing a control method of a display comprising: an LCD panel; a back light to illuminate the LCD panel; an inverter to supply electric power to the back light and adjust an intensity of illumination of the back light, the control method of the display comprising: sensing an environmental intensity of illumination; detecting a brightness distribution data of an inputted video signal; determining lightness of an image based on at least one of the sensed environmental intensity of illumination and the detected brightness distribution data of the inputted video signal, when a function to adjust the intensity of illumination of the back light according to at least one of the environmental intensity of illumination and the brightness distribution data of the imputed video signal is selected; and controlling the inverter to adjust the intensity of the illumination of the back light according to the determined lightness.

According to an aspect of the invention, the control method of a display further comprises detecting the brightness distribution data by intensifying a contrast of the inputted video signal to a predetermined gain.

According to an aspect of the invention, the control method of a display further comprises: controlling a contrast intensifying gain to decrease and the intensity of illumination of the back light to decrease, if the controller determines that the inputted video signal is dark based on the brightness distribution data detected by the brightness distribution data detector, and controlling the contrast intensifying gain to increase and the intensity of illumination of the back light to decrease to a predetermined level, if according to an aspect of the invention the controller determines that the inputted video signal is dark.

According to an aspect of the invention, the control method of a display further comprises: controlling the inverter to decrease the intensity of illumination of the back light, if determined that the environmental intensity of illumination is low and controlling the inverter to increase the intensity of illumination of the back light, if determined that the environmental intensity of illumination is high.

According to an aspect of the invention, the control method of a display further comprises: controlling the inverter to decrease the intensity of illumination of the back light, if determined that the inputted video signal is dark based on the detected brightness distribution data and controlling the inverter to increase the intensity of illumination of the back light, if determined that the inputted video signal is light.

The foregoing and/or other aspects of the present invention are also achieved by providing a display comprising: an LCD panel; a back light to illuminate the LCD panel; an inverter to supply electric power to the back light and adjust an intensity of illumination of the back light; a selector to select a function to adjust the intensity of illumination of the back light according to at least one of an environmental intensity of illumination and brightness distribution data of an inputted video signal; a brightness distribution data detector to detect the brightness distribution data of the inputted video signal; an sensor for an environmental intensity of illumination to sense the environmental intensity of illumination; and a controller to determine the lightness of an image based on at least one of the environmental intensity of illumination sensed by the sensor for an environmental intensity of illumination and the brightness distribution data detected by the brightness distribution data detector according to a selection through the selector and control the inverter to adjust the intensity of illumination of the back light according to the determined lightness.

According to an aspect of the invention, the display further comprises a contrast intensifier to intensify a contrast of the inputted video signal to a predetermined gain and supply the intensified contrast to the brightness distribution data detector.

According to an aspect of the invention, the controller controls the contrast intensifier to decrease a contrast gain and the inverter to decrease the intensity of illumination of the back light, if the controller determines that the inputted video signal is dark based on the brightness distribution data detected by the brightness distribution data detector, and the controller controls the contrast intensifier to increase a contrast gain and the inverter to decrease the intensity of illumination of the back light to a predetermined level, if the controller determines that the inputted video signal is bright.

According to an aspect of the invention, the controller controls the inverter to decrease the intensity of illumination of the back light, if the controller determines that the environmental intensity of illumination is low based on the sensing signal sensed by the sensor for an environmental intensity of illumination, and, the controller controls the inverter to increase the intensity of illumination of the back light, if the controller determines that the environmental intensity of illumination is high.

According to an aspect of the invention, the controller controls the inverter to decrease the intensity of illumination of the back light, if the controller determines that inputted video signal is dark based on the brightness distribution data detected by the brightness distribution data detector, and the controller controls the inverter to increase the intensity of illumination of the back light, if the controller determines that the inputted video signal is light.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE EMBODIMENTS

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 1:
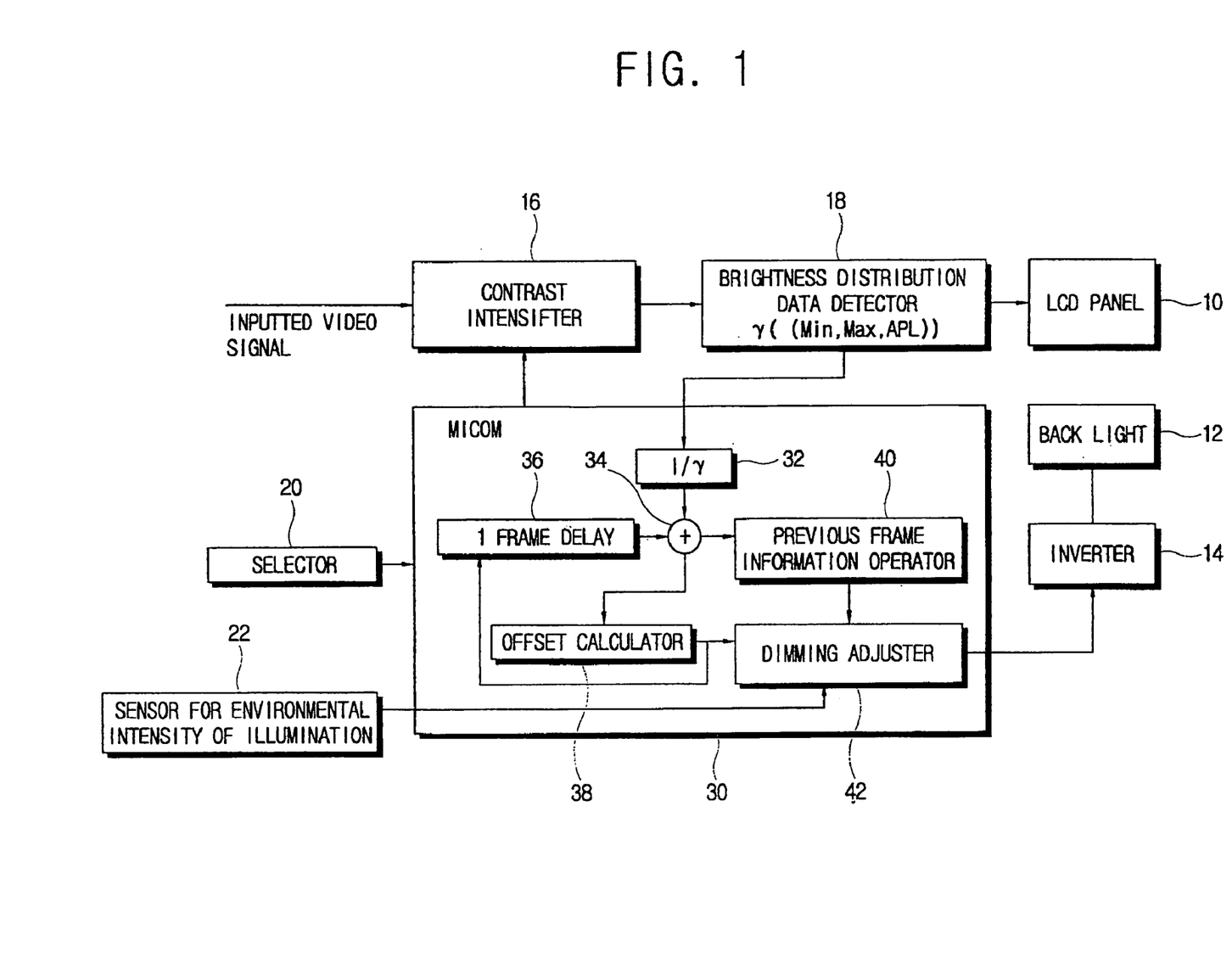
FIG. 1 is a block diagram of a display according to an embodiment of the invention.

As shown in FIG. 1, a display according to an embodiment of the present invention comprises an LCD panel 10, a back light 12 to illuminate the LCD panel 12, an inverter 14 to operate the back light 12, a selector 20 to select a function to adjust an intensity of illumination of the back light 12 according to at least one of an intensity of illumination of environment and brightness distribution data of an inputted video signal; a brightness distribution data detector 18 to detect the brightness distribution data of an inputted video signal, a sensor for an environmental intensity of illumination 22 to sense the environmental intensity of illumination, a contrast intensifier 16 to intensify a contrast of the inputted video signal to a predetermined gain and supply the intensified contrast to the brightness distribution data detector 18 and a microcomputer(MICOM) 30 to determine the lightness based on at least one of the environmental intensity of illumination sensed by the sensor for an environmental intensity of illumination 22 and the brightness distribution data detected by the brightness distribution data detector 18 according to a selection through the selector 20 and to control the contrast intensifier 16 and the inverter 14 according to the determined lightness. The display further comprises a power supply (not shown) to convert alternating current supplied from the outside into direct current and supply the converted direct current to the inverter 14.

The inverter 14 converts the direct current supplied by the power supply into alternating current and supplies the converted alternating current to the back light 12 to operate.

Here, the inverter 14 increases or decreases voltage of the direct current supplied from the power supply according to a control signal of the MICOM 30 to supply it to the back light 12. The inverter 14 uses a lightness adjusting method such as an analog dimming (AD), pulse width modulation (PWM) dimming, or a complex method of the analog dimming and PWM.

The selector 20 comprises a plurality of buttons to select and input a function to adjust the intensity of illumination of the back light 12 according to the environmental intensity of illumination, a function to adjust the intensity of illumination of the back light 12 according to the brightness distribution data of the inputted video signal, and a function to adjust the intensity of illumination of the back light 12 according to the environmental intensity of illumination and the brightness distribution data of the inputted video signal, respectively.

The sensor for the environmental intensity of illumination 22 is preferably an optical sensor sensing an external intensity of radiation. The optical sensor converts a level of the sensed intensity of radiation into a digital signal to output the digital signal. The digital signal sensing the intensity of radiation outputted from the optical sensor is transferred to the MICOM 30 through an I²C bus by a control of the I²C bus of the MICOM 30.

The contrast intensifier 16 intensifies the contrast of the inputted video signal. The contrast intensifier 16 sets low and high levels of the inputted video signal and intensifies the contrast by applying a predetermined gain within the low and high levels.

Figure 2:
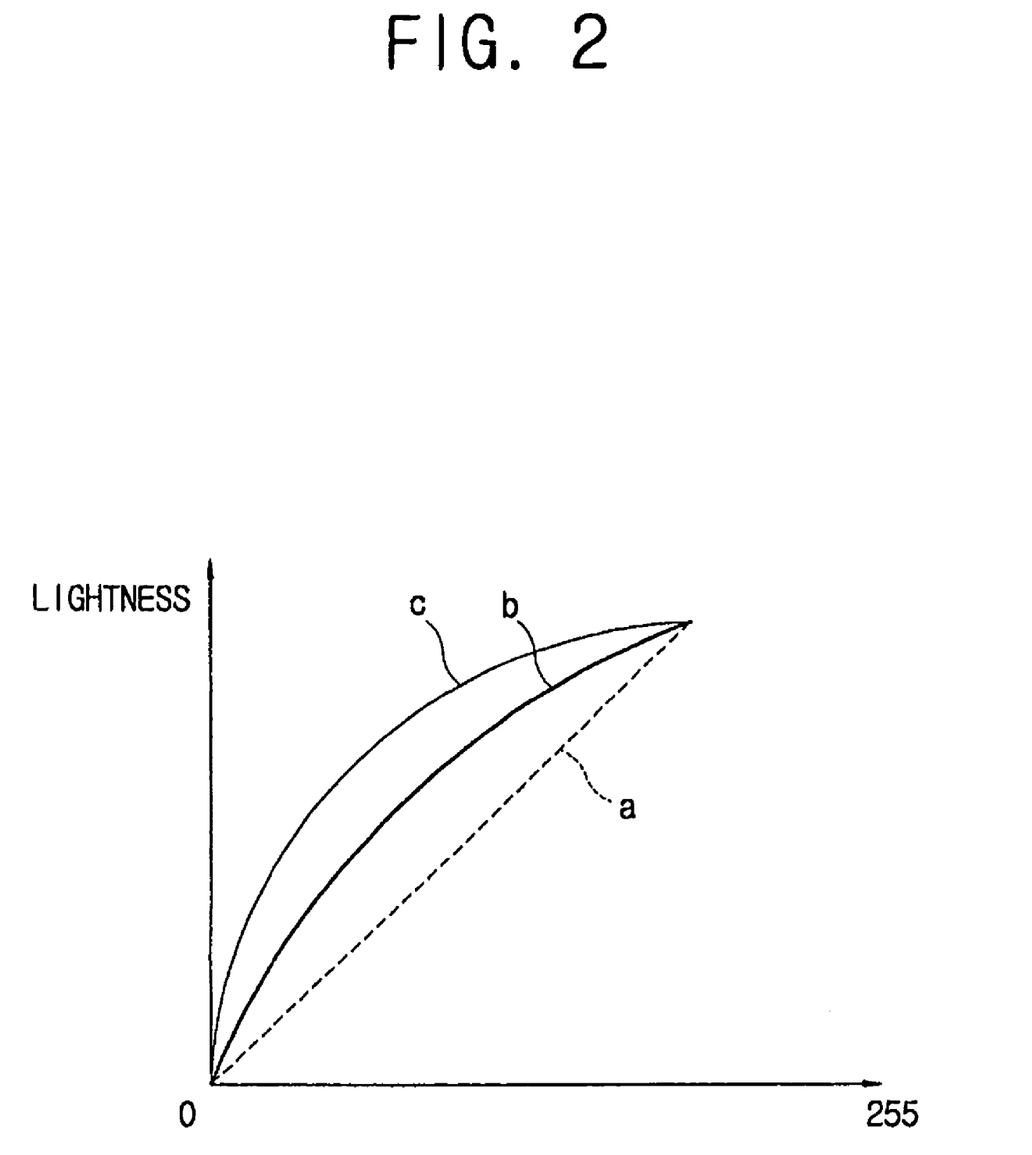
FIG. 2 is a graph illustrating intensified contrast levels of a contrast intensifier in FIG. 1.

FIG. 2 shows signals having intensified contrast output from the contrast intensifier 16. As shown in FIG. 2, "a" is a normal signal and "b" and "c" are signals having the intensified contrasts.

The brightness distribution data detector 18 detects brightness distribution data of the inputted video signal after the signal of intensified contrast is input by the contrast intensifier 16. The brightness distribution data includes average brightness data, minimum brightness data, maximum brightness data, and the like.

If a video signal for a moving image is input, the brightness distribution data detector 18 transfers brightness distribution data for every frame through the 12C bus to the MICOM 30. The moving image is a visual representation, for example, a moving picture or a graphic representation.

The MICOM 30 outputs PWM signals, each having a duty ratio different from one another, to the inverter 14 according to the sensing signal transferred from the sensor for an environmental intensity of illumination 22. Thus, current is varied corresponding to the environmental intensity of illumination 22 and the corresponding current is supplied to the back light 12 so that the intensity of illumination of the back light 12 can be adjusted.

Figure 3:
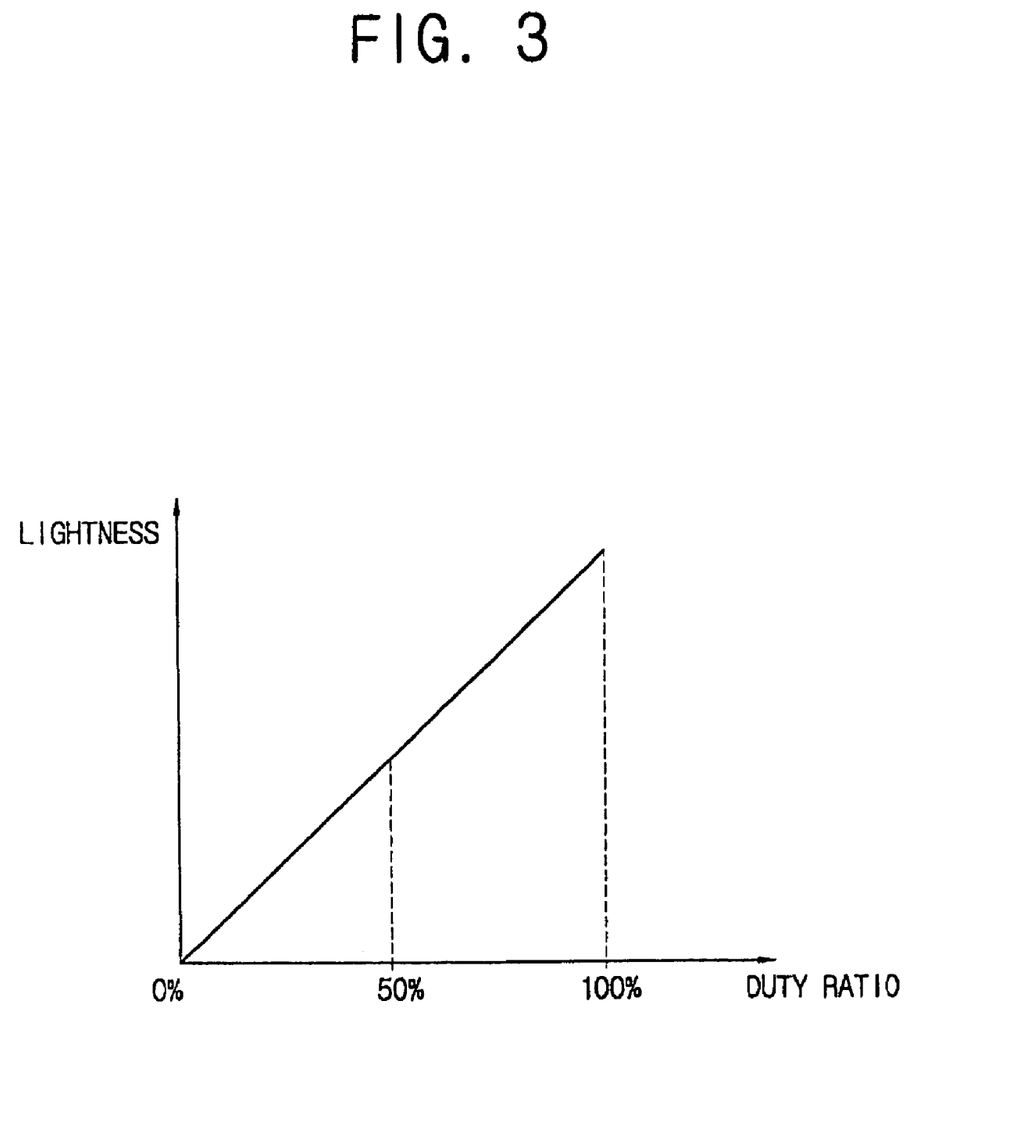
FIG. 3 is a graph illustrating an intensity of illumination of a back light according to a duty ratio of a pulse width modulation signal.

That is, if the MICOM 30 determines that the environmental intensity of illumination is low based on the sensing signal sensed by the sensor for an environmental intensity of illumination 22 the MICOM 30 outputs the PWM signal having a decreased duty ratio to the inverter 14 to decrease the intensity of illumination of the back light 12. If the MICOM determines that the environmental intensity of illumination is high, the MICOM 30 outputs the PWM signal having an increased duty ratio to the inverter 14 to increase the intensity of illumination of the back light 12 (refer to FIG. 3).

Further, if the MICOM 30 determines that an image is dark based on brightness distribution data detected by the brightness distribution data detector 18, the MICOM 30 sends a corresponding feedback control signal to the contrast intensifier 16 and controls the contrast intensifier 16 to decrease a contrast intensifying gain of the contrast intensifier 16 (refer to "b" in FIG. 2) and the inverter 14 to decrease the intensity of illumination of the back light 12. The image is a visual representation, for example, a picture or a graphic representation.

In contrast thereto, if the MICOM 30 determines that an image on a screen is light, the MICOM 30 sends the corresponding feedback control signal to the contrast intensifier 16 and controls the contrast intensifier 16 to increase a contrast intensifying gain (refer to "c" in FIG. 2) and the inverter 14 to decrease the intensity of illumination of the back light 12 to a predetermined level, thereby providing the most suitable image.

The MICOM 30 controls the inverter 14 according to at least one of the brightness distribution data detected by the brightness distribution data detector 18 and the environmental intensity of illumination sensed by the sensor for an environmental intensity of illumination 22.

The MICOM 30 comprises a gamma inverter 32 to inverse the brightness distribution data detected by the brightness distribution data detector 18, an offset calculator 38 to calculate an offset between present brightness distribution data and brightness distribution of the previous frame, a previous frame information operator 40 to set a suitable value for a brightness distribution data of the previous frame according to a brightness distribution and a dimming adjuster 42 that considers the suitable value for a brightness distribution data of the previous frame corresponding to a brightness distribution set by the previous frame information operator 40 and the offset calculated by the offset calculator 38 and calculates a dimming adjusting value according to present brightness distribution data to output an analog or a PWM dimming signal to the inverter 14.

The dimming adjuster 42 outputs a corresponding analog or a corresponding PWM dimming signal based on a sensed signal of the sensor for an environmental intensity of illumination to the inverter 14.

Figure 4:
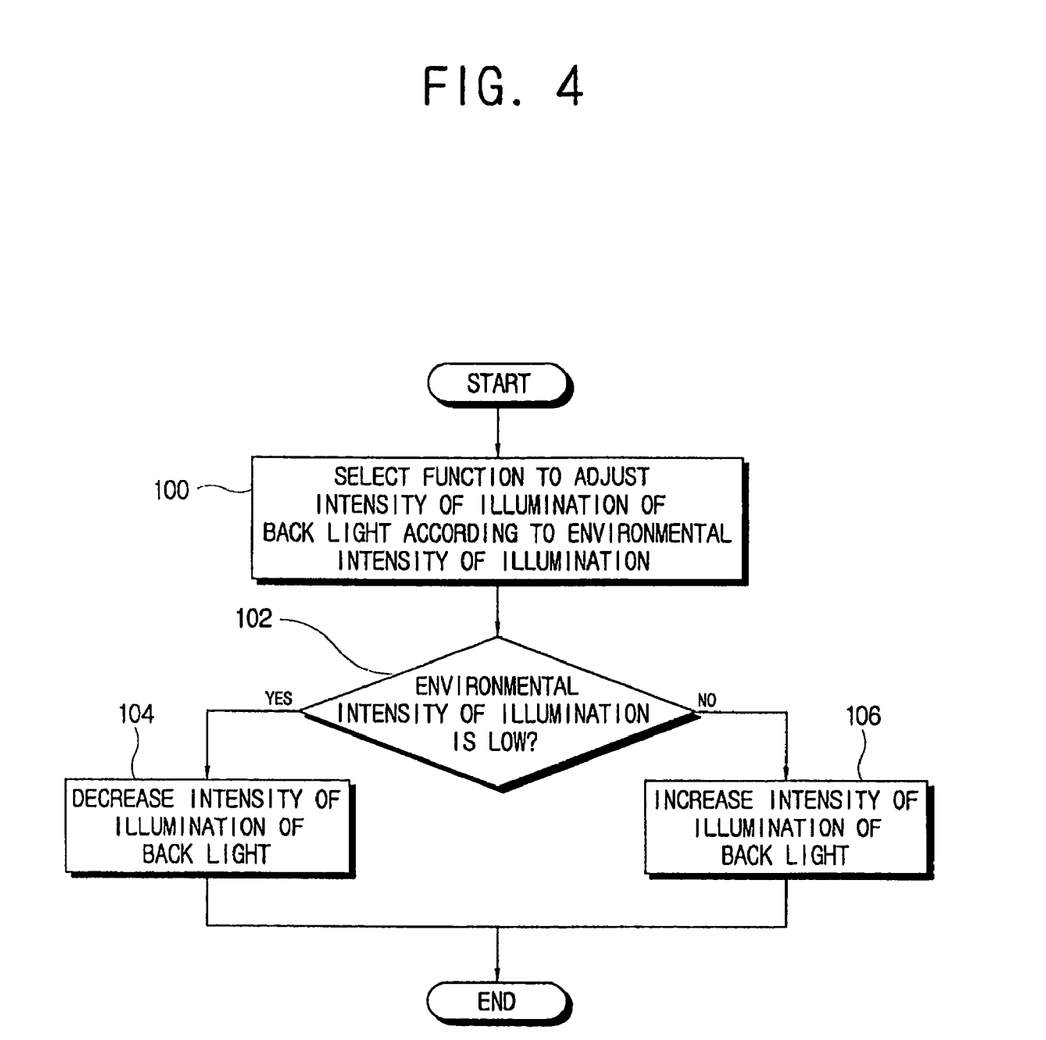
FIG. 4 is a flow chart of a display according to the embodiment of the invention.

With the above configuration, the display according to a first embodiment of the present invention is controlled as shown in FIG. 4.

If a brightness adjusting function selecting signal for the back light 12 according to a environmental intensity of illumination is input at operation 100, the MICOM 30 determines the environmental intensity of illumination based on the sensed result of the sensor for an environmental intensity of illumination 22 at operation 102. If determined that the environmental intensity of illumination is low, the MICOM 30 outputs a PWM signal having a decreased duty ratio to the inverter 14 to decrease the intensity of illumination of the back light 12 at operation 104. If determined that the environmental intensity of illumination is high, the MICOM 30 outputs a PWM signal having an increased duty ratio to the inverter 14 to increase the intensity of illumination of the back light 12 at operation 106.

Figure 5:
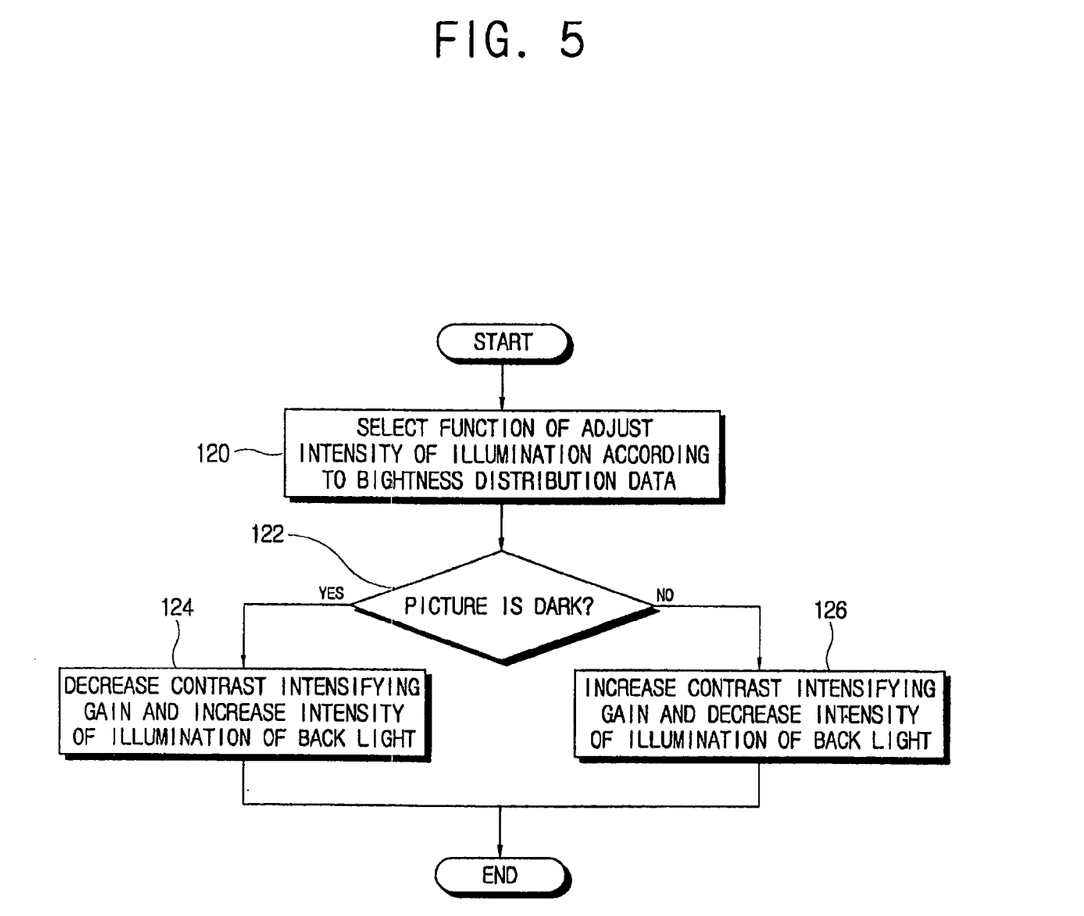
FIG. 5 is a flow chart of a display according to a second embodiment of the invention.

FIG. 5 is a control flow chart of a display according to a second embodiment of the present invention.

If a brightness adjusting function selecting signal for the back light 12 according to a brightness distribution data is input at operation 120, the MICOM 30 determines the lightness of the inputted video signal based on the detected result of the brightness distribution data detector 18 at operation 122. If determined that the inputted video signal is dark, the MICOM 30 controls the contrast intensifier 16 to decrease a contrast intensifying gain and the inverter 14 to decrease the intensity of illumination of the back light 12 at operation 124. If determined that the inputted video signal is light, the MICOM 30 controls the contrast intensifier 16 to increase a contrast intensifying gain and the inverter 14 to decrease the intensity of illumination of the back light 12 to a predetermined level at operation 126, thereby providing the most suitable image. To detailed adjust the intensity of illumination of the back light 12, the PWM dimming method is preferably used.

In the above embodiments, only one of the environmental intensity of illumination and the brightness distribution data is considered to adjust the lightness of the back light 12. However, both of the environmental intensity of illumination and the brightness distribution data may be considered to adjust the lightness of the back light 12.

If determined that the inputted video signal is dark based on the brightness distribution data detected by the brightness distribution data detector 18, the MICOM 30 may control the inverter 14 to decrease the intensity of the illumination of the back light 12. If determined that the inputted video signal is light, the MICOM 30 may control the inverter 14 to increase the intensity of the illumination of the back light 12.

In the above embodiments, the brightness distribution data detector 18 detects brightness distribution data of the inputted video signal after the signal of intensified contrast is input by the contrast intensifier 16. However, the contrast intensifier 16 intensifies the contrast of the video signal passing through the brightness distribution data detector 18.

According to the invention, the intensity of illumination of the back light is automatically adjusted according to the brightness of one of the environmental intensity of illumination and brightness distribution data of an inputted video signal as the selection of the user. Thus, the visual fatigue of a user is decreased and the contrast of light and darkness is increased, thereby providing a more suitable image.

As described above, the present invention provides the display in which the intensity of illumination of the back light is automatically adjusted according to at least one of the environmental intensity of illumination and the brightness distribution data of the inputted video signal as a selection of a user to provide the most suitable image and control method thereof.

Although a few embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A display comprising:
a liquid crystal display panel;
a back light to illuminate the liquid crystal display panel;
an inverter to supply electric power to the back light and adjust an intensity of illumination of the back light;
a selector to select a function to adjust the intensity of illumination of the back light according to at least one of an environmental intensity of illumination and a brightness distribution data of an inputted video signal;
a brightness distribution data detector to detect the brightness distribution data of the inputted video signal;
a sensor to sense the environmental intensity of illumination;
a controller to determine a lightness of an image based on at least one of the environmental intensity of illumination sensed by the sensor for an environmental intensity of illumination and the brightness distribution data detected by the brightness distribution data detector according to a selection through the selector and to control the inverter to adjust the intensity of illumination of the back light according to the determined lightness; and
a contrast intensifier to intensify a contrast of the inputted video signal to a predetermined gain and to supply the intensified contrast to the brightness distribution data detector.

2. The display according to claim 1 wherein the controller controls the contrast intensifier to decrease a contrast gain and controls the inverter to decrease the intensity of illumination of the back light if the inputted video signal is dark based on the brightness distribution data, and
the controller controls the contrast intensifier to increase the contrast gain and controls the inverter to decrease the intensity of illumination of the back light to a predetermined level if the inputted video signal is bright.

3. The display according to claim 2, wherein the controller controls the inverter to decrease the intensity of illumination of the back light if the environmental intensity of illumination is low, and,
the controller controls the inverter to increase the intensity of illumination of the back light if the environmental intensity of illumination is high.

4. The display according to claim 1, wherein the controller controls the inverter to decrease the intensity of illumination of the back light if the environmental intensity of illumination is low, and
the controller controls the inverter to increase the intensity of illumination of the back light if the environmental intensity of illumination is high.

5. The display according to claim 1, wherein the controller controls the inverter to decrease the intensity of illumination of the back light if the environmental intensity of illumination is low, and,
the controller controls the inverter to increase the intensity of illumination of the back light if the environmental intensity of illumination is high.

6. A display comprising;
a liquid crystal display panel;
a back light to illuminate the liquid crystal display panel;
an inverter to supply electric power to the back light and adjust an intensity of illumination of the back light;
a selector to select a function to adjust the intensity of illumination of the back light according to at least one of an environmental intensity of illumination and a brightness distribution data of an inputted video signal;
a brightness distribution data detector to detect the brightness distribution data of the inputted video signal:
a sensor to sense the environmental intensity of illumination; and
a controller to determine a lightness of an image based on at least one of the environmental intensity of illumination sensed by the sensor for an environmental intensity of illumination and the brightness distribution data detected by the brightness distribution data detector according to a selection through the selector and to control the inverter to adjust the intensity of illumination of the back light according to the determined lightness,
wherein the controller controls the inverter to decrease the intensity of illumination of the back light if the inputted video signal is dark based on the brightness distribution data, and
the controller controls the inverter to increase the intensity of illumination of the back light if the inputted video signal is light.

7. A control method of a display including a liquid crystal display panel, a back light to illuminate the LCD panel, an inverter to supply electric power to the back light and adjust an intensity of illumination of the back light, the control method of the display comprising:
sensing an environmental intensity of illumination;
detecting a brightness distribution data of an inputted video signal;
determining lightness of an image based on at least one of the sensed environmental intensity of illumination and the detected brightness distribution data of the inputted video signal when a user selects a function to adjust the intensity of illumination of the back light according to the at least one of the environmental intensity of illumination and the brightness distribution data of the inputted video signal;
controlling the inverter to adjust the intensity of the illumination of the back light according to the determined lightness; and
detecting the brightness distribution data after intensifying a contrast of the inputted video signal to a predetermined gain.

8. The control method of a display according to claim 7 further comprising:
decreasing a contrast intensifying gain and decreasing the intensity of illumination of the back light if the inputted video signal is dark based on the detected brightness distribution data; and
increasing the contrast intensifying gain and decreasing the intensity of illumination of the back light to a predetermined level if the inputted video signal is light based on the detected brightness distribution data.

9. The control method of a display according to claim 7, further comprising:
controlling the inverter to decrease the intensity of illumination of the back light if the environmental intensity of illumination is low and controlling the inverter to increase the intensity of illumination of the back light if the environmental intensity of illumination is high.

10. The control method of a display according to claim 7, further comprising:

controlling the inverter to decrease the intensity of illumination of the back light if the environmental intensity of illumination is low and controlling the inverter to increase the intensity of illumination of the back light if the environmental intensity of illumination is high.

11. The control method of a display according to claim 8, further comprising:
controlling the inverter to decrease the intensity of illumination of the back light if the environmental intensity of illumination is low and controlling the inverter to increase the intensity of illumination of the back light if the environmental intensity of illumination is high.

12. A control method of a display including a liquid crystal display panel, a back light to illuminate the LCD panel, an inverter to supply electric power to the back light and adjust an intensity of illumination of the back light, the control method of the display comprising:
sensing an environmental intensity of illumination;
detecting a brightness distribution data of an inputted video signal;
determining lightness of an image based on at least one of the sensed environmental intensity of illumination and the detected brightness distribution data of the inputted video signal when a user selects a function to adjust the intensity of illumination of the back light according to the at least one of the environmental intensity of illumination and the brightness distribution data of the inputted video signal;
controlling the inverter to adjust the intensity of the illumination of the back light according to the determined lightness; and
controlling the inverter to decrease the intensity of illumination of the back light if the inputted video signal is dark based on the detected brightness distribution data and controlling the inverter to increase the intensity of illumination of the back light if the inputted video signal is light.

13. A display apparatus for adjusting an intensity of illumination of a back light, comprising:
an inverter inverting direct current to alternating current to supply power to the back light;
a sensor sensing an environmental intensity of illumination;
a contrast intensifier intensifying a contrast of the inputted video signals;
a brightness detector detecting brightness distribution data of the inputted video signals of intensified contrast; and
a controller receiving the sensed environmental intensity of illumination or the detected brightness distribution data and outputting analog signals and/or pulse width modulation signals to the inverter to increase or decrease the intensity of illumination of the back light, wherein duty ratios of the pulse width modulation signals and/or voltages of the analog signals vary as the environmental intensity of illumination or the brightness distribution data.
wherein the controller controls the contrast intensifier to decrease a contrast intensifying gain and controls the inverter to decrease the intensity of illumination of the back light if an image is dark based on the detected brightness distribution data.

14. The display apparatus of claim 13, wherein the controller outputs pulse modulation signals having a decreased duty ratio to decrease the intensity of illumination of the back light if the environmental intensity of illumination is low.

15. The display apparatus of claim 13, wherein the controller outputs pulse modulation signals having an increased duty ratio to increase the intensity of illumination of the back light if the environmental intensity of illumination is high.

16. A display apparatus for adjusting an intensity of illumination of a back light, comprising:
an inverter inverting direct current to alternating current to supply power to the back light;
a sensor sensing an environmental intensity of illumination;
a contrast intensifier intensifying a contrast of the inputted video signals;
a brightness detector detecting brightness distribution data of the inputted video signals of intensified contrast; and
a controller receiving the sensed environmental intensity of illumination or the detected brightness distribution data and outputting analog signals and/or pulse width modulation signals to the inverter to increase or decrease the intensity of illumination of the back light, wherein duty ratios of the pulse width modulation signals and/or voltages of the analog signals vary as the environmental intensity of illumination or the brightness distribution data,
wherein the controller controls the contrast intensifier to increase a contrast intensifying gain and controls the inverter to decrease the intensity of illumination of the back light to a predetermined level if an image is light based on the detected brightness distribution data.

17. The display apparatus of claim 13, further comprising a selector to select a function to adjust the intensity of illumination of the back light according to at least one of the environmental intensity of illumination, the brightness distribution data.

18. A display apparatus for adjusting an intensity of illumination of a back light, comprising:
an inverter inverting direct current to alternating current to supply power to the back light;
a sensor sensing an environmental intensity of illumination;
a contrast intensifier intensifying a contrast of the inputted video signals;
a brightness detector detecting brightness distribution data of the inputted video signals of intensified contrast; and
a controller receiving the sensed environmental intensity of illumination or the detected brightness distribution data and outputting analog signals and/or pulse width modulation signals to the inverter to increase or decrease the intensity of illumination of the back light, wherein duty ratios of the pulse width modulation signals and/or voltages of the analog signals vary as the environmental intensity of illumination or the brightness distribution data,
wherein the contrast intensifier sets low and high levels of the inputted video signals and intensifies the contrast by applying a predetermined gain within the low and high levels.

19. A method of adjusting an intensity of illumination of a back light on a display device, comprising:
selecting a function to automatically adjust the intensity of illumination of the back light according to a level of brightness; and
decreasing a contrast intensifying gain and decreasing the intensity of illumination of the back light if an image is dark based on brightness distribution data and increasing the contrast intensifying gain and decreasing the intensity of illumination of back light if the image is light based on the brightness distribution data.

20. A method of adjusting an intensity of illumination of a back light on a display device, comprising:
selecting a function to automatically adjust the intensity of illumination of the back light according to at least one of an environmental intensity of illumination and brightness distribution data of inputted video signals;
sensing an environmental intensity of illumination to determine if the environmental intensity of illumination is low or high based on a predetermined value, and correspondingly decreasing the intensity of illumination of the back light if the environmental intensity of illumination is low and increasing the intensity of illumination of the back light if the environmental intensity of illumination is high; and
detecting a brightness level of intensified contrast signals to determine if an image is dark or light based on brightness distribution data and correspondingly decreasing a contrast intensifying gain and decreasing an intensity of illumination of the back light if the image is dark and increasing the contrast intensifying gain and decreasing the intensity of illumination of back light if the image is light.

21. The method of claim 20, further comprising intensifying the contrast of inputted video signals by applying a predetermined gain corresponding to set low and high levels of the inputted video signals.

22. The method of claim 20, further comprising outputting pulse width modulation signals having a decreased duty ratio to decrease the intensity of illumination of the back light if the environmental intensity of illumination is low.

23. The method of claim 20, further comprising outputting pulse width modulation signals having an increased duty ratio to increase the intensity of illumination of the back light if the environmental intensity of illumination is high.

24. The method of claim 20, wherein the detecting brightness distribution data is performed after intensifying the contrast of the inputted video signals.

25. A display comprising:
a liquid crystal display panel;
a back light to illuminate the liquid crystal display panel;
a sensor to sense an environmental intensity of illumination;
a brightness distribution data detector to detect a brightness distribution data of an inputted video signal;
an inverter to supply electric power to the back light and adjust an intensity of illumination of the back light;
a contrast intensifier to adjust a contrast of the inputted video signal and to supply the adjusted contrast to the brightness distribution data detector; and
a controller to control the inverter to adjust the intensity of illumination of the back light according to at least one of the environmental intensity of illumination sensed by the sensor and the brightness distribution data detected by the brightness distribution data detector.

26. The display according to claim 25, wherein the contrast intensifier intensifies the contrast of the inputted video signal to a predetermined gain and supplies the intensified contrast to the brightness distribution data detector.

27. The display according to claim 26, wherein the controller controls the contrast intensifier to decrease a contrast gain to the predetermined gain and controls the inverter to decrease the intensify of illumination of the back light if the inputted signal is dark based on the brightness distribution data.

28. The display according to claim 27, wherein the controller controls the inverter to decrease the intensity of illumination of the back light if the environmental intensity of illumination is low.

29. The display according to claim 27, wherein the controller controls the inverter to increase the intensity of illumination of the back light if the environmental intensity of illumination is high.

30. The display according to claim 26, wherein the controller controls the contrast intensifier to increase a contrast gain to the predetermined gain and controls the inverter to decrease the intensify of illumination of the back light if the inputted signal is bright based on the brightness distribution data.

31. The display according to claim 25, wherein the controller controls the inverter to decrease the intensity of illumination of the back light if the environmental intensity of illumination is low.

32. The display according to claim 25, wherein the controller controls the inverter to increase the intensity of illumination of the back light if the environmental intensity of illumination is high.

33. The display according to claim 25, further comprising:
a selector to select a function to adjusting the intensity of illumination of the back light according to at least one of the environmental intensity of illumination and the brightness distribution data of the inputted video signal.

34. A control method of a display including a liquid crystal display panel, a back light to illuminate the LCD panel, and a brightness distribution data detector, the control method of the display comprising:
sensing an environmental intensity of illumination;
detecting a brightness distribution data of an inputted video signal;
adjusting a contrast of the inputted video signal;
adjusting the intensity of the illumination of the back light according to at least one of the environmental intensity of illumination and the brightness distribution data; and
supplying the adjusted contrast to the brightness distribution data detector.

35. The control method of a display according to claim 34, further comprising:
decreasing a contrast gain to a predetermined gain and decreasing the intensity of illumination of the back light if the inputted video signal is dark based on the detected brightness distribution data.

36. The control method of a display according to claim 35, further comprising:
decreasing the intensity of illumination of the back light if the environmental intensity of illumination is low.

37. The control method of a display according to claim 35, further comprising:
increasing the intensity of illumination of the back light if the environmental intensity of illumination is high.

38. The control method of a display according to claim 34, further comprising:
increasing a contrast gain to a predetermined gain and decreasing the intensity of illumination of the back light if the inputted video signal is light based on the detected brightness distribution data.

39. The control method of a display according to claim 34, further comprising:
decreasing the intensity of illumination of the back light if the environmental intensity of illumination is low.

40. The control method of a display according to claim 34, further comprising:

increasing the intensity of illumination of the back light if the environmental intensity of illumination is high.

41. The control method of a display according to claim 34, further comprising:

selecting a function to adjust the intensity of illumination of the back light according to at least one of the environmental intensity of illumination and the brightness distribution data of the inputted video signal.

* * * * *

UNITED STATES PATENT AND TRADEMARK OFFICE
CERTIFICATE OF CORRECTION

PATENT NO. : 7,202,458 B2
APPLICATION NO. : 10/959260
DATED : April 10, 2007
INVENTOR(S) : Kil-soo Park It is certified that error appears in the above-identified patent and that said Letters Patent is hereby corrected as shown below:

On the title page item (54), Line 1, Change "DISPLAY AND CONTROL METHOD THEREOF" to --DISPLAY APPARATUS AND METHOD FOR AUTOMATICALLY ADJUSTING THE ILLUMINATION OF THE BACK LIGHT--.

First Page, Column 2 (Abstract), Line 3, After "light and" change "adjust" to --adjusts--.

First Page, Column 2 (Abstract), Line 4, After "function to" change "adjusts" to --adjust--.

Column 1 (Title), Line 1, Change "DISPLAY AND CONTROL METHOD THEREOF" to --DISPLAY APPARATUS AND METHOD FOR AUTOMATICALLY ADJUSTING THE ILLUMINATION OF THE BACK LIGHT--.

Column 7, Line 34, After "claim 1" insert --,--.

Column 7, Line 65, Change "comprising;" to --comprising:--.

Column 6, Line 8, Change "signal:" to --signal;--.

Column 9, Line 57, Change "data." to --data,--.

Column 12, Line 1, Change "intensify" to --intensity--.

Column 12, Line 15, Change "intensify" to --intensity--.

Signed and Sealed this

Twenty-eighth Day of August, 2007

JON W. DUDAS
*Director of the United States Patent and Trademark Office*

UNITED STATES PATENT AND TRADEMARK OFFICE
CERTIFICATE OF CORRECTION

PATENT NO. : 7,202,458 B2
APPLICATION NO. : 10/959260
DATED : April 10, 2007
INVENTOR(S) : Kil-soo Park It is certified that error appears in the above-identified patent and that said Letters Patent is hereby corrected as shown below:

On the title page item (54), Line 1, Change "DISPLAY AND CONTROL METHOD THEREOF" to --DISPLAY APPARATUS AND METHOD FOR AUTOMATICALLY ADJUSTING THE ILLUMINATION OF THE BACK LIGHT--.

First Page, Column 2 (Abstract), Line 3, After "light and" change "adjust" to --adjusts--.

First Page, Column 2 (Abstract), Line 4, After "function to" change "adjusts" to --adjust--.

Column 1 (Title), Line 1, Change "DISPLAY AND CONTROL METHOD THEREOF" to --DISPLAY APPARATUS AND METHOD FOR AUTOMATICALLY ADJUSTING THE ILLUMINATION OF THE BACK LIGHT--.

Column 7, Line 34, After "claim 1" insert --,--.

Column 7, Line 65, Change "comprising;" to --comprising:--.

Column 8, Line 8, Change "signal:" to --signal;--.

Column 9, Line 57, Change "data." to --data,--.

Column 12, Line 1, Change "intensify" to --intensity--.

Column 12, Line 15, Change "intensify" to --intensity--.

This certificate supersedes the Certificate of Correction issued August 28, 2007.

Signed and Sealed this

First Day of April, 2008

JON W. DUDAS
*Director of the United States Patent and Trademark Office*